United States Patent [19]
Han

[11] Patent Number: 5,646,494
[45] Date of Patent: Jul. 8, 1997

[54] CHARGE INDUCTION APPARATUS OF ROBOT CLEANER AND METHOD THEREOF

[75] Inventor: Suk-Jin Han, Suwon, Rep. of Korea

[73] Assignee: Samsung Electronics Co., Ltd., Suwon, Rep. of Korea

[21] Appl. No.: 397,993

[22] Filed: Mar. 3, 1995

[30] Foreign Application Priority Data

Mar. 29, 1994 [KR] Rep. of Korea ............... 94-6380
May 26, 1994 [KR] Rep. of Korea ............... 94-11530

[51] Int. Cl.⁶ .................................................. A47L 11/00
[52] U.S. Cl. ..................................... 318/587; 320/2
[58] Field of Search ............................ 318/580, 587; 180/167, 168, 169; 364/424.01, 424.02, 424.03, 426.04; 320/2

[56] References Cited

U.S. PATENT DOCUMENTS

| | | | |
|---|---|---|---|
| 4,556,940 | 12/1985 | Katoo et al. | 318/587 |
| 5,163,001 | 11/1992 | Luke, Jr. | 180/169 X |
| 5,279,672 | 1/1994 | Betker et al. | 318/587 X |
| 5,321,614 | 6/1994 | Ashworth | 318/587 X |
| 5,446,356 | 8/1995 | Kim | 318/587 |

*Primary Examiner*—Jonathan Wysocki
*Attorney, Agent, or Firm*—Burns, Doane, Swecker & Mathis, L.L.P.

[57] ABSTRACT

The present invention relates to a charging apparatus for a robot cleaner and a method for charging the robot cleaner by which the robot cleaner can be accurately induced to a power source supplier to receive a battery charge when a battery power source drops below a predetermined level. The apparatus includes a control unit for controlling an overall operation, a memory which stores a driving program including structures for various rooms for which cleaning operations may be performed, and a driving unit for moving the robot cleaner in forward, reverse, left and right directions according to control signals of the control unit. A travel distance detecting unit is provided for detecting a travel distance covered by the driving unit and a travel direction detecting unit is provided for detecting a travel direction varied by the driving unit. An obstacle detecting unit is also provided for detecting whether or not there is an obstacle with a cleaning area and for detecting a distance to the obstacle from the cleaner. A charged level detecting unit detects a charge voltage level of a battery and an electric power source supplier is provided for charging the battery to above a predetermined level when the charge voltage level of the battery detected by the charge level detecting unit drops below the predetermined level. An electric power source receiving unit is also provided for electrically connecting the electric power source supplier to the battery so that the power source supplied from the electric power source supplier can be applied to charge the battery.

7 Claims, 13 Drawing Sheets

CHARGE INDUCTION APPARATUS OF ROBOT CLEANER AND METHOD THEREOF

BACKGROUND OF THE INVENTION

1. Field of the Invention

The present invention relates to a charging apparatus for a robot cleaner and a method thereof by which the robot cleaner can be accurately induced to a power source supplier for battery charging when a battery power source for supplying an operating energy to the robot cleaner drops below a predetermined level.

2. Description of the Prior Art

A conventional robot cleaner for performing a cleaning operation while its battery power source is being automatically charged is illustrated in FIG. 1, which includes a robot cleaner 1, a battery 10 provided at a left upper surface thereof in order to supply an operating electric power source to the robot cleaner 1, electric power source receiving means 120 disposed at a rear surface of the cleaner 1 and electrically connected to the battery 10 for charging the battery 10 the when the voltage of the battery 10 is consumed thereby to cause the same to drop below a predetermined charge level, and electric power source supplying means 130 mounted at a certain wall surface W through the intermediary of a wiring 135 within a cleaning area in order to supply the power to the power source receiving means 120.

The power source supply means 130 includes a power transmission unit 131 for converting a commercial AC power source to a DC voltage of a predetermined level necessary for charging the battery thereby outputting the same to other units, a light emitting unit 132 for emitting an optical signal to induce the cleaner 1 so that the DC voltage output by the power transmission unit 131 can be supplied to the cleaner 1, and a connection 133 for connecting the power source supply means 130 to the cleaner 1 so that the cleaner 1 can be electrically connected to the power transmission unit 131 when the optical signal is output from the light emitting unit 132.

Furthermore, the power source receiving means 120 includes a light receiving unit 121 for receiving the optical signal emitted from the light emitting unit 132 of the power source supply means 130, an electric power receiving unit 122 for receiving the DC voltage supplied through the power transmission unit 131 of the power supply means 130 when the optical signal is received from the light receiving unit 121, and a contact terminal 123 for being electrically connected to the battery 10 via a wiring 125 so that an end portion of the connection 133 at the power source means 130 can be accepted.

In the case of the conventional robot cleaner thus described, when a power source of the battery 10 for supplying an operating energy to the cleaner 1 is consumed thereby to cause the same to drop below a predetermined level in the midst of the cleaning operation or during completion stage of the same, the cleaner stops the cleaning operation and starts to move by itself toward the power source supply means 130 disposed on a wall surface. A control means (not shown) recognizes information of a present position of the cleaner and a position information of the power source supply means.

At this time, the optical signal emitted from the light emitting unit 132 of the power supply means 130 is detected by a light receiving means 121 of the power receiving means 120 provided at a rear surface of the cleaner 1.

The control means, based on the detected signal, so controls that the cleaner 1 direct the cleaner to the power supply means 130.

When the cleaner 1 reaches a place near the light emitting unit 132 by being induced to the power supply means 130 according to the optical signal emitted by the light emitting unit 132, the light receiving unit 121 detects the optical signal output from the light emitting unit 132, and the cleaner 1 approaches the power supply means 130 and the end portion of the connection 133 at the power supply means 130 is received by the contact terminal 123 of the power receiving means 120.

Accordingly, the power supply means 130 and the power receiving means 120 are electrically connected, so that a power source voltage applied from an AC power source input terminal is converted to a DC voltage by the power transmission unit 131, and input to the power receiving unit 122. The DC voltage input to the power receiving unit 122 is applied to the battery 10 via a wiring, thereby causing the battery 10 to start to be charged.

However, in the induction method of the power supply means 130 of the cleaner 1 thus described, because the cleaner 1 moves to the power supply means 130 according to inherent position information, and because the wheels of the cleaner 1 slip or skid according to material characteristic and condition of a floor surface on which the cleaner 1 moves, the information of the present position of the cleaner 1 inevitably varies.

Consequently, the cleaner 1 cannot reach the power supply means 130 of the cleaner accurately, so that, as illustrated in FIG. 2, there occurs an allowance to the left and right sides of an imaginary center 136 when viewed from above, thereby serving to broaden an error area 137, which cause a phenomenon where the optical signal of the light emitting unit 132 cannot be received by the light receiving unit 121.

Accordingly, a problem occurs in that trial and error adjustments are repeated where the cleaner 1 is moved to the left side or to the right side in order for the light receiving unit 121 to detect the optical signal of the light emitting unit 132, thereby causing an induction time to be delayed.

There is another problem in that, in order to accurately induce the cleaner to the power supply means, a separate sensor for position correction should be installed, thereby increasing manufacturing cost according to additional use of a sensor and to complicate the construction thereof.

Furthermore, there is still another problem in that a power transmission unit of the power supply means and a power receiving unit of the power receiving means in a conventional robot cleaner are exposed to the exterior, so that safety of the devices cannot be guaranteed nor can an external appearance of the cleaner be made stylish.

SUMMARY OF THE INVENTION

Accordingly, the present invention is presented to solve the aforesaid problems, and it is an object of the present invention to provide a charge induction apparatus for a robot cleaner and a method thereof by which the robot cleaner can be accurately guided or induced to the power supply source according to position information provided in advance at the power supply unit when the battery electric source drops below a predetermined level in the midst of the cleaning operating or during completion stage of the cleaning operation, so that manufacturing cost of the cleaner can be reduced and structure thereof can be simplified.

In accordance with one aspect of the present invention, there is provided a charge induction apparatus for a robot cleaner for travelling along a studied route for carrying out the cleaning operation, the apparatus includes: control means for controlling an overall operation; memory means for storing a driving program the structure of various rooms for which to perform cleaning operations; driving means for moving the robot cleaner in forward and reverse directions and in left and right directions according to control of the control means; travel distance detecting means for detecting a travel distance covered by the driving means; travel direction detecting means for detecting a travel direction varied by the driving means; obstacle detecting means for detecting whether or not there is an obstacle within a cleaning area and for detecting a distance to the obstacle from the cleaner; charged level detecting means for detecting a charged voltage level of a battery changing according to the travel of the cleaner; an electric power source supplier for charging the battery to above a predetermined level when the charged voltage level of the battery detected by the charged level detected means drops below the predetermined level; and an electric power source receiving means for electrically connecting the electric power source supplier to the battery so that the power source supplied from the electric power source supplier can be applied to the battery.

In accordance with another aspect of the present invention, there is provided a charge induction method for a robot cleaner having internally stored information on a self position thereof, a cleaning area and a position of an electric power source supplier and for moving thereafter by itself, the method comprising the steps of:

storing in a control means initial position information of the cleaner against X and Y axes within the cleaning area during an initial contact between the cleaner and the electric power source supplier, in other words, before movement of the cleaner for a cleaning operation;

detecting the power source in order to check to what degree a battery power source for supplying a driving energy to the cleaner has been consumed during a movement of the cleaner during the cleaning operation; and moving the cleaner to the electric power source supplier according to the initial position information stored at the initial position information storage step in order to charge a battery when the battery power source detected by the power source detecting step is below a predetermined level set up by the control means.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Hereinafter, the embodiment of the present invention will be described in detail with reference to the accompanying drawings.

Figure 1:
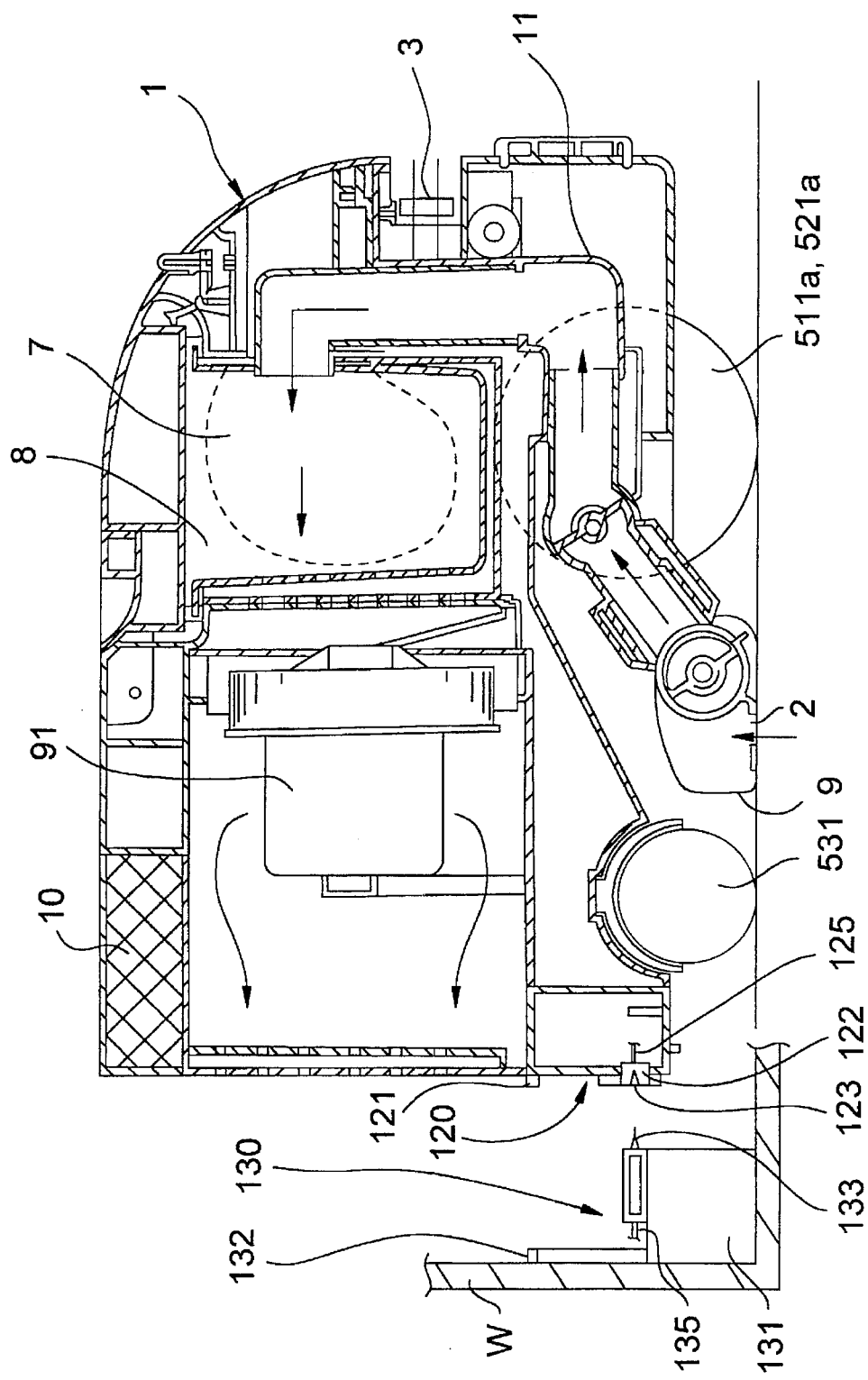
FIG. 1 is side sectional view of a conventional robot cleaner.
Figure 2:
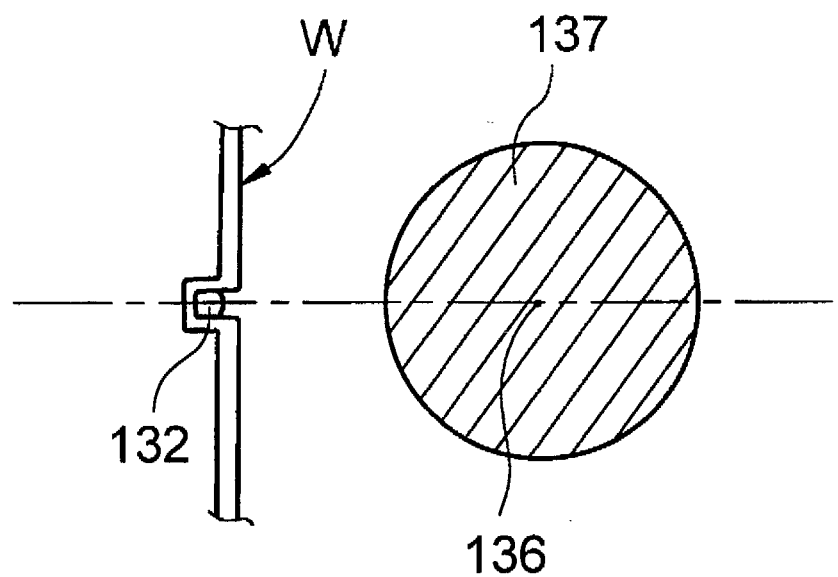
FIG. 2 is a schematic diagram of an error area according to an induction method of a conventional robot cleaner.
Figure 3:
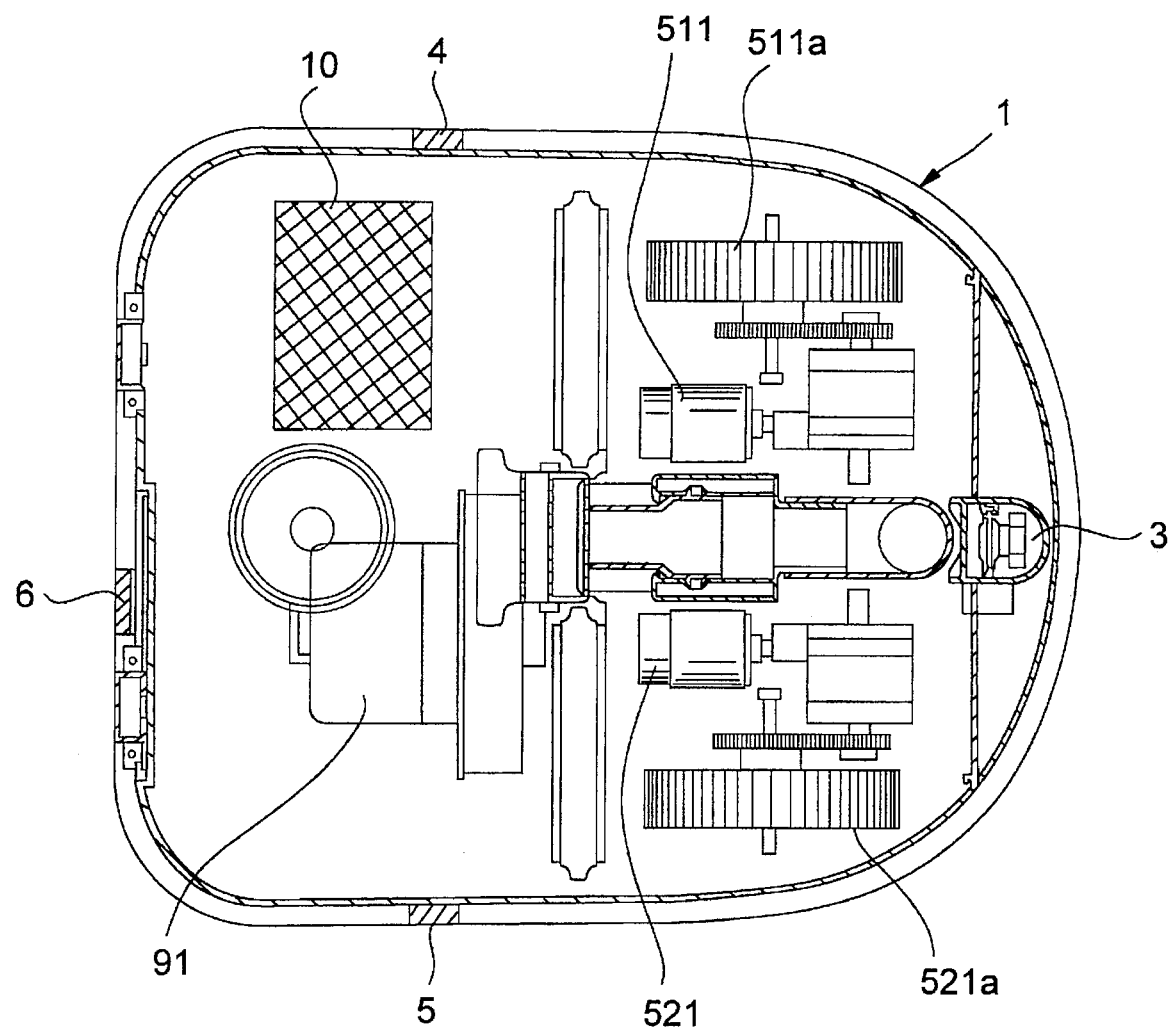
FIG. 3 is a plan view of the robot cleaner with an upper cover of a body removed in accordance with an embodiment of the present invention.
Figure 4:
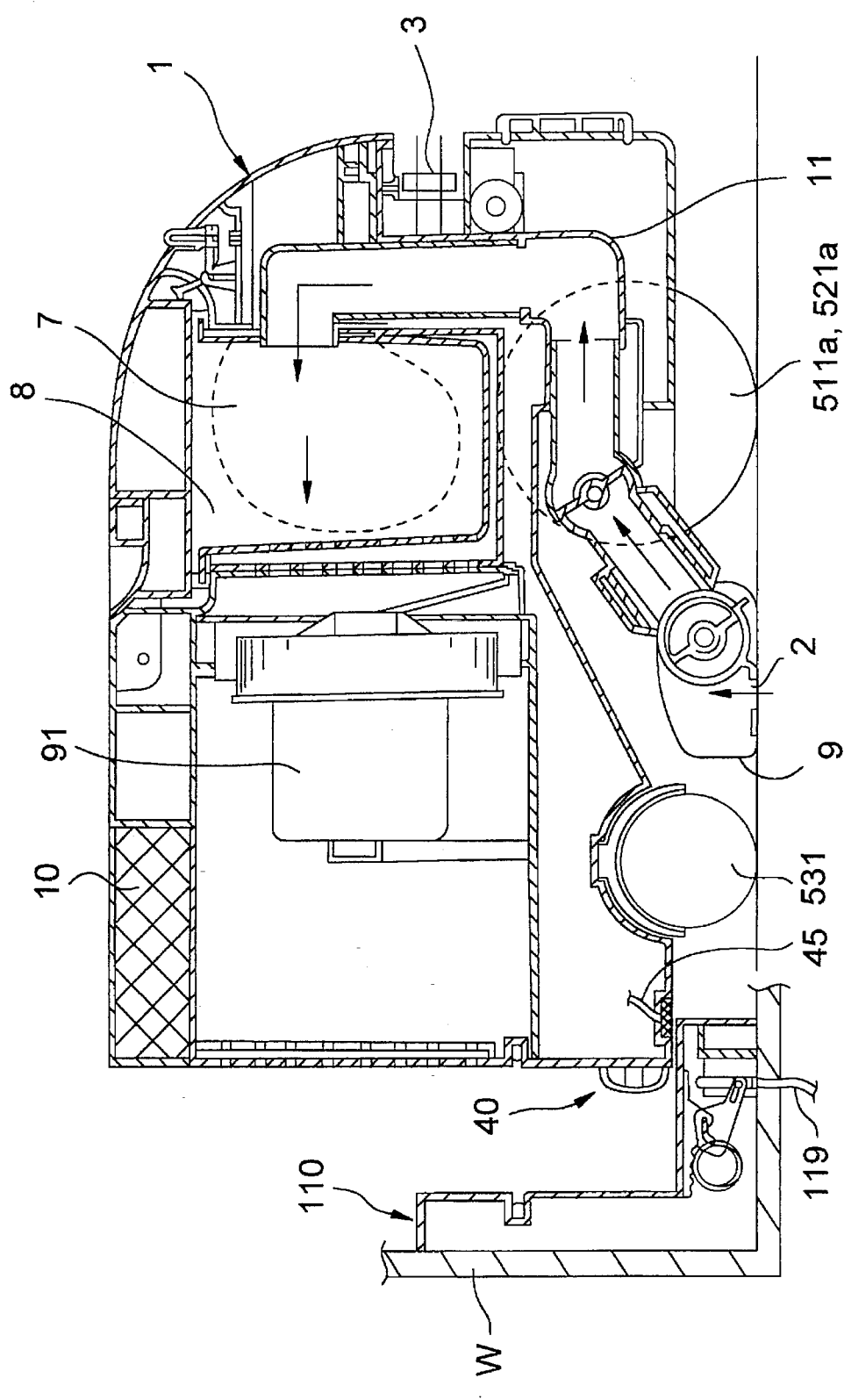
FIG. 4 is a side sectional view of the robot cleaner according to the embodiment of the present invention.

A body of a cleaner (hereinafter referred to as "robot cleaner") is denoted by reference numeral 1 in FIG. 3.

The robot cleaner 1 is mounted at a front surface thereof with a navigation ultrasonic sensor 3 (hereinafter referred to as "navigation sensor") for emitting ultrasonic waves in order to detect a distance and a direction to an obstacle and whether or not there is an obstacle within a rotational range thereof while serving to rotate 180 degrees in left or right direction with a front forward direction as a base according to a turning effect applied from a driving unit and the like, and for receiving a signal generated by the emitted ultrasonic wave reflected from the obstacle.

The robot cleaner is provided at left and right side surfaces and a rear surface thereof with fixed type ultrasonic sensors 4, 5 and 6 (hereinafter referred to as "ultrasonic sensor") for generating ultrasonic waves to detect a distance to a fixed object in a normal direction, and more precisely, a distance to a wall surface within a cleaning area, and for receiving a signal generated by the emitted ultrasonic wave reflected from a wall surface W.

Furthermore, the navigation sensor 3 is symmetrically disposed at lower left and right portions thereof with left and right steering motors 511 and 521 for generating a driving force so that the robot cleaner 1 can change directions in the forward and/or reverse directions and in the left and/or right directions.

The left and right steering motors 511 and 521 are respectively mounted with left and right power-driven wheels 511a and 521a.

The robot cleaner 1 is mounted therein with a suction motor 91 for generating a suction force in order to absorb dust and foreign objects. The suction motor 91 is formed at a front surface thereof with a dust chamber 8 having a built-in dust collecting pocket 7 for collecting thereinto the dust, foreign objects and the like absorbed into a suction inlet 2.

The robot cleaner 1 is rotatably installed at a rear bottom surface thereof with a wheel 531 for sustaining a weight applied to a rear end of the robot cleaner 1. It should be noted that the wheel 531, because it is not connected to a power source such as the motor or the like, must have a capability of rotating 360 degrees so that a travel route of the robot cleaner can be easily changed.

Furthermore, there is provided a brush 9 between the wheel 531 and the power-driven wheels 511a and 521a in order to collect the dust and foreign objects. The dust and the like absorbed through the suction inlet 2 formed at a rear side of the brush 9 are collected at a dust collection pocket 7 via a hood 11.

In the drawing, the robot cleaner 1 is provided at an approximate rear surface thereof with a battery 10 for supplying an operating energy thereto.

The robot cleaner 1 also employs at a rear lower area thereof a power source receiving means 40 for being electrically connected to the battery 10 via a wire in order to charge the battery 10.

The power source supplier 110 for being electrically connected to the power source receiving means 40 in order to supply the power to the battery 10 is disposed at a predetermined wall surface W within the cleaning area.

Figure 5:
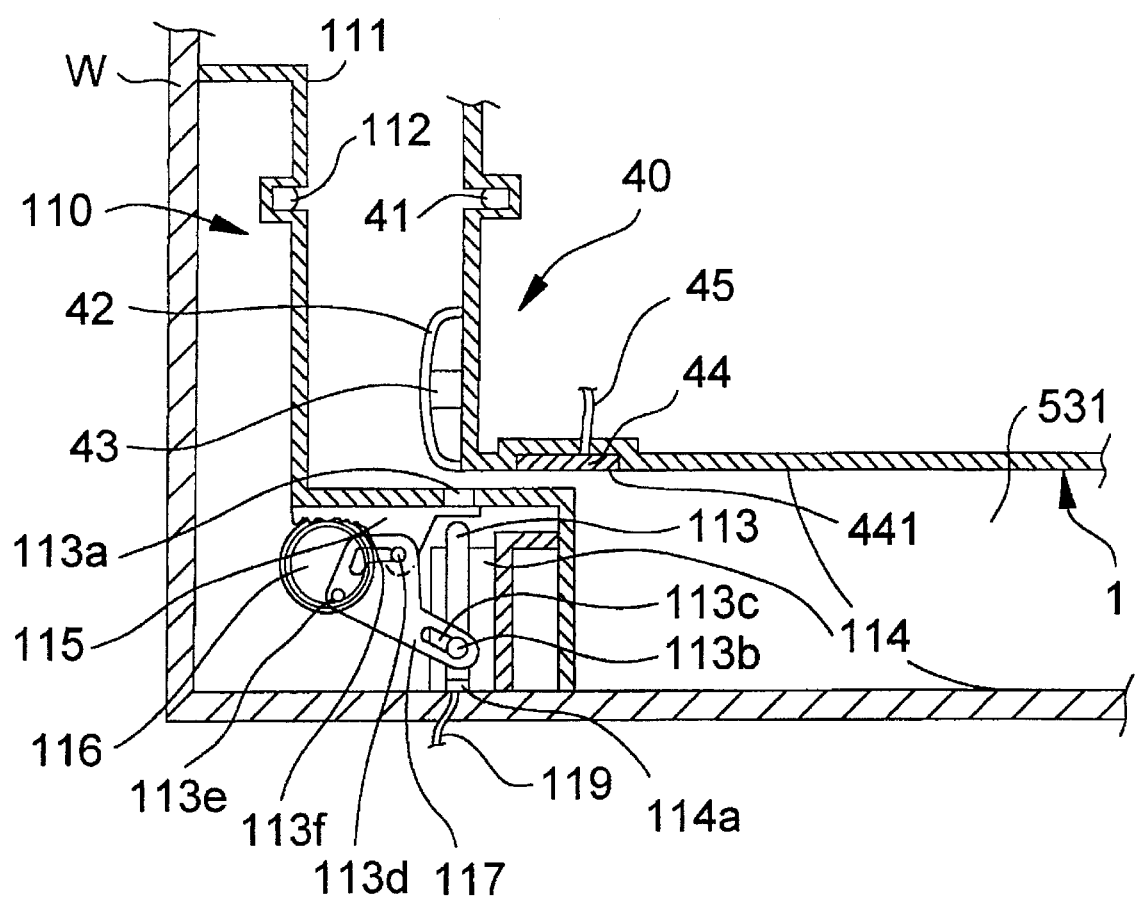
FIG. 5 is a schematic side sectional view of the robot cleaner and an electric power source supplier during a non-charge period of the battery according to the present invention.
Figure 6:
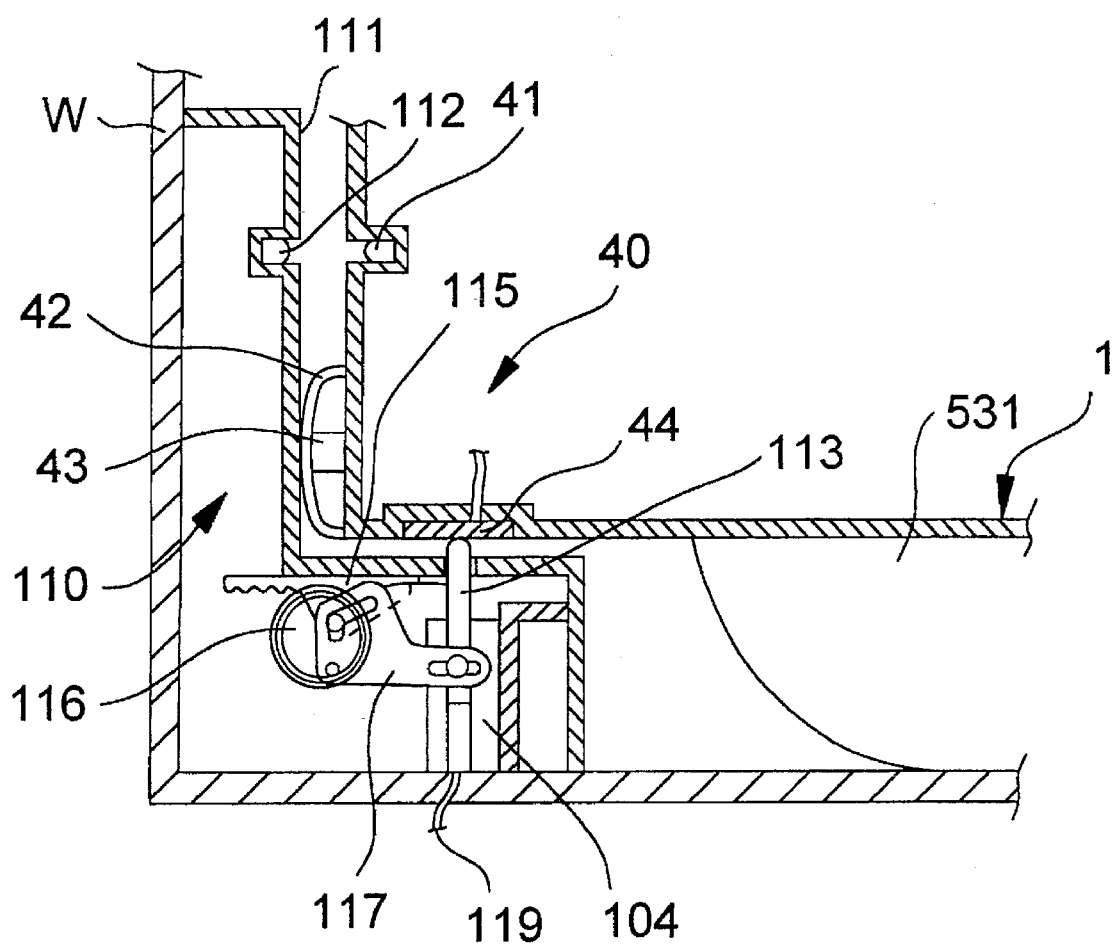
FIG. 6 is a schematic side sectional view of the power source supplier and the robot cleaner during a charge period of the battery according to the present invention.

The power source supplier 110 for supplying the power to the battery 10, as illustrated in FIGS. 5 and 6, includes a body 111, a light emitting unit 112 disposed at an external upper side of a vertical portion on the body 111 so that an optical signal can be emitted to induce the robot cleaner 1. A connecting terminal 113 is movably mounted within an inner area of a horizontal portion on the body 111 so that the battery can be electrically connected to a contact surface of the power source receiving means 40 of the robot cleaner 1 being induced by the optical signal emitted from the light emitting unit 122. A guide member 114 is formed in the body 111 with a guide groove 114a in order to guide the connecting terminal 113. A cover member 115 is slidably mounted at an inner upper side of the horizontal portion on the body 111 so that the connecting terminal 113 operationally connected to the guide groove 114a of the guide member 114 can be covered in order not to be seen from outside. A pinion member 116 is rotated to serve to slide the cover member 115, and a link member 117 connects the pinion member 116, cover member 115 and connects terminal 113 thereamong so that the connecting terminal 113 can be moved up and down by a turning effect of the pinion member 116 and the cover member 115 slid by the turning effect of the pinion member 116.

The power source supplier 110 is connected via a wiring 119 to a main power source terminal (not shown) disposed on a wall surface along which the robot cleaner 1 moves.

Meanwhile, the power source supplier 110 is formed at an upper surface of the horizonal portion at the body 111 with a through hole 113a so that the connecting terminal 113 can be extended therethrough.

It should be apparent that the body 111 is equipped therein with a rectifying circuit for converting a power source voltage of commercial AC power source input from the main power source terminal to a DC power source, so that the battery can be charged during contact with the main power source terminal.

The guide member 114 is electrically connected to an electric wire 119 disposed within the wall surface W in order to apply the power to the connecting terminal 113 sliding within the guide member 114.

The connecting terminal 113 is formed at a lower area thereof with a first protruder 113b so that the link member 117 can be hitched thereby.

The cover member 115 is provided at a lower left surface thereof with rack teeth in order to exercise straight line motion in cooperation with teeth of the pinion member 116, and is formed at an approximate lower center side thereof with a protruder which in turn is provided with a second protruder 113d to which connects to the link member 117.

The pinion member 116 is disposed at a side thereof with a third protruder 113e which connects the link member to the pinon member and thereby causes the link member to be rotated.

The link member 117 is respectively disposed with a first slide hole 113c where the first protruder 113b is accepted for sliding, a second slide hole 113f where the second protruder 113d is accepted for sliding and a through hole where the third protruder 113e is accepted for rotation.

Furthermore, the power source receiving means 40 for electrically connecting the battery 10 internally provided at the robot cleaner 1 to the power source supplier 110 includes, as illustrated in FIGS. 5 and 6, a light receiving unit 41 attached on a rear surface of the robot cleaner 1 in order to receive the optical signal emitted from the light emitting unit 112 of the power source supplier 110, a bumper member 42 attached under the light receiving unit 41 in order to cushion a shock of the power source receiving means 40 when the receiving means hits a side surface of a vertical portion at the power source supplier 110. A contact sensor 43 is disposed within the bumper member 42 to detect a fact that the power receiving means 40 has contacted the power source supplier 110, and a contact terminal 44 for is formed at a lower left surface of the robot cleaner 1 so that a connecting terminal 113 of the power source supplier 110 can contact the battery 10 via a wiring 45.

The contact terminal 44 is formed with a flat surface at a contact surface 441 thereof so that the connecting terminal 113 of the power source supply means 110 can be easily contacted, even though an induction error of the power source receiving means 40 induced by the power source supply means 110 is large.

Next, a block diagram for control of the robot cleaner according to the embodiment of the present invention will be described with reference to FIG. 7.

Figure 7:
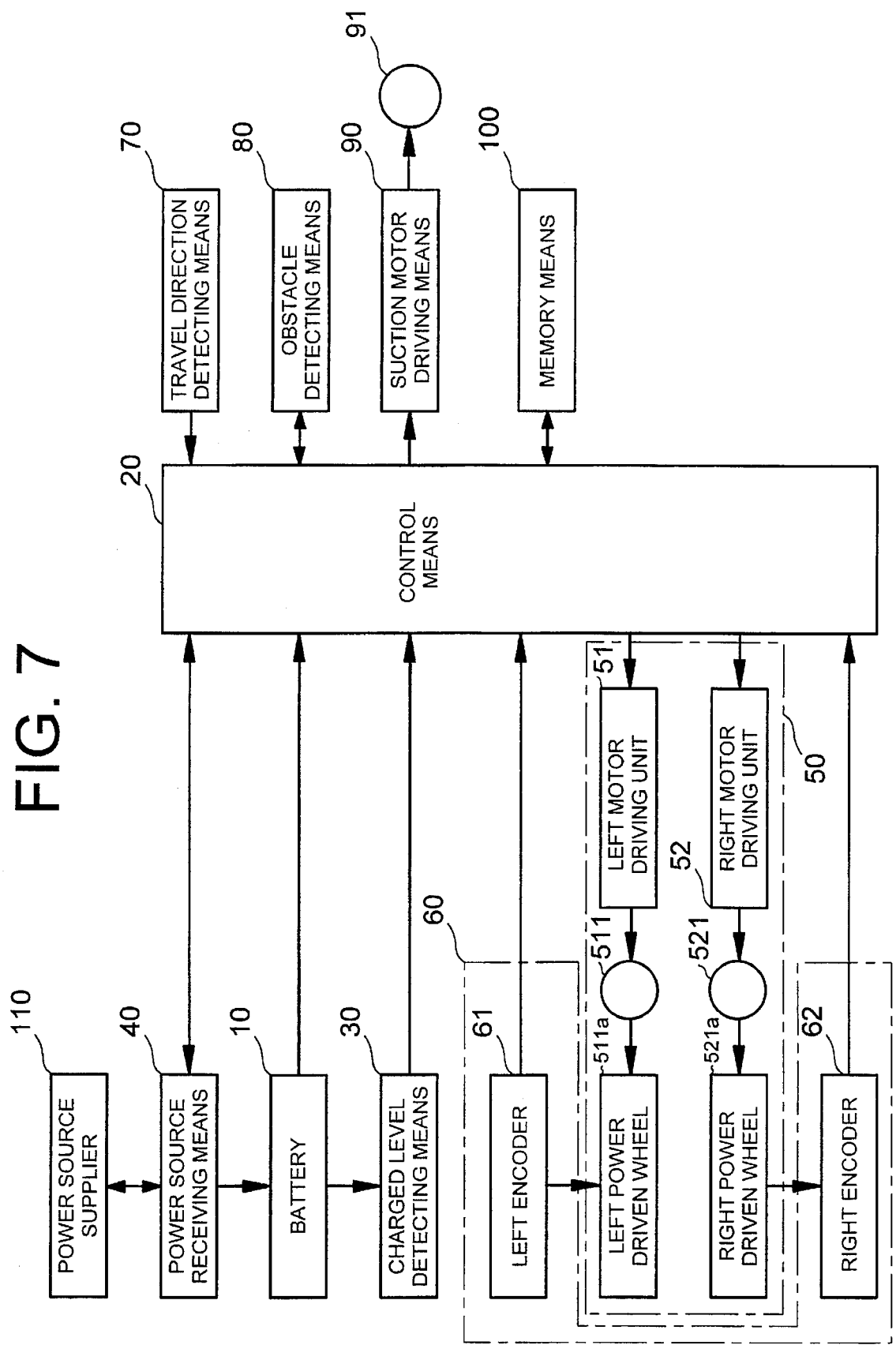
FIG. 7 is a block diagram illustrating control of the robotic vacuum cleaner according to the embodiment of the present invention.

As evidenced in FIG. 7, control means 20 denote a microcomputer for controlling overall operations of the robot cleaner 1 by being supplied with a DC voltage from the battery.

Charge level detecting means 30 detects a charge level of the battery 10 for supplying an operational energy to the robot cleaner thereby to output the charge level detected therefrom to the control means 20.

Power source receiving means 40 receives the DC voltage generated from the power source supplier 110 thereby to connect the battery 10 to the power source supplier 110 according to control of the control means when the charge level of the battery 10 detected by the charge level detecting means 30 drops below a predetermined level pre-established by the control means 20.

Driving means 50 controls movement to forward/reverse and left/right directions of the robot cleaner 1 according to control of the control means 20, the driving means 50 including a left motor driving unit 51 for driving a left travel motor 511 in order to move the robot cleaner 1 to the right side according to the control of the control means 20, and a right motor driving unit 52 for driving a right travel motor 521 in order to move the robot cleaner 1 to the left side according to the control of the control means 20.

Travel distance detecting means 60 serves to detect travel distance of the robot cleaner 1 moved by the driving means 50, the travel distance detecting means 60 including a left encoder 61 for generating a pulse signal according to revolution of the left travel motor 511 thereby to detect a travel distance the robot cleaner 1 has covered in the right direction, and a right encoder 62 for generating a pulse signal according to revolution of the right travel motor 521 thereby to detect a travel distance the robot cleaner has covered in the left direction.

Furthermore, travel direction detecting means 70 denotes a gyro sensor for detecting a rotary angle according to a voltage level change of the sensor due to rotation thereby the travel direction variation of the robot cleaner 1 moving according to the control of the driving means can be detected.

Obstacle detecting means 80 includes a navigation sensor 3 and ultrasonic sensors 4, 5 and 6 for emitting ultrasonic waves in order to detect a distance to an obstacle and to detect whether or not there is an obstacle within a domain where the cleaning operation should be done, and for receiving a signal generated by reflection of the ultrasonic waves hitting the obstacle.

Suction motor driving means 90 drives a suction motor 91 for generating suction force so that the robot cleaner 1 can perform the cleaning operation according to the control of the control means 20. In addition, a memory means 100 stores therein a driving program of structure of various rooms where the cleaning operation is to be carried out.

Now, an operational effect of the charge induction apparatus and a method thereof for charging the battery of the robot cleaner thus constructed will be described.

Figure 8A:
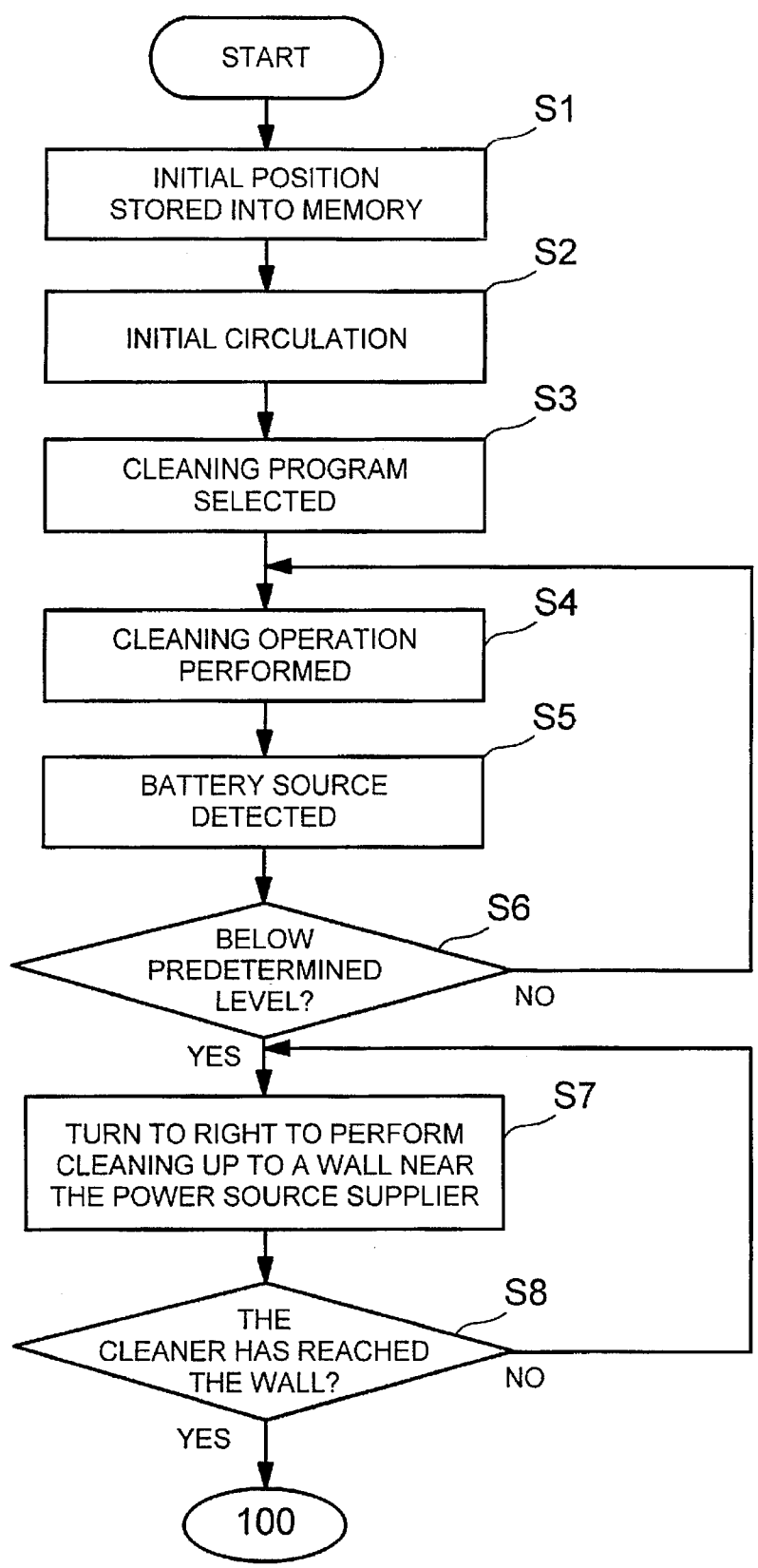
FIGS. 8A, 8B and 8C are flow charts for illustrating a control operation procedure of the charge induction for the robot cleaner according to the present invention.
Figure 8B:
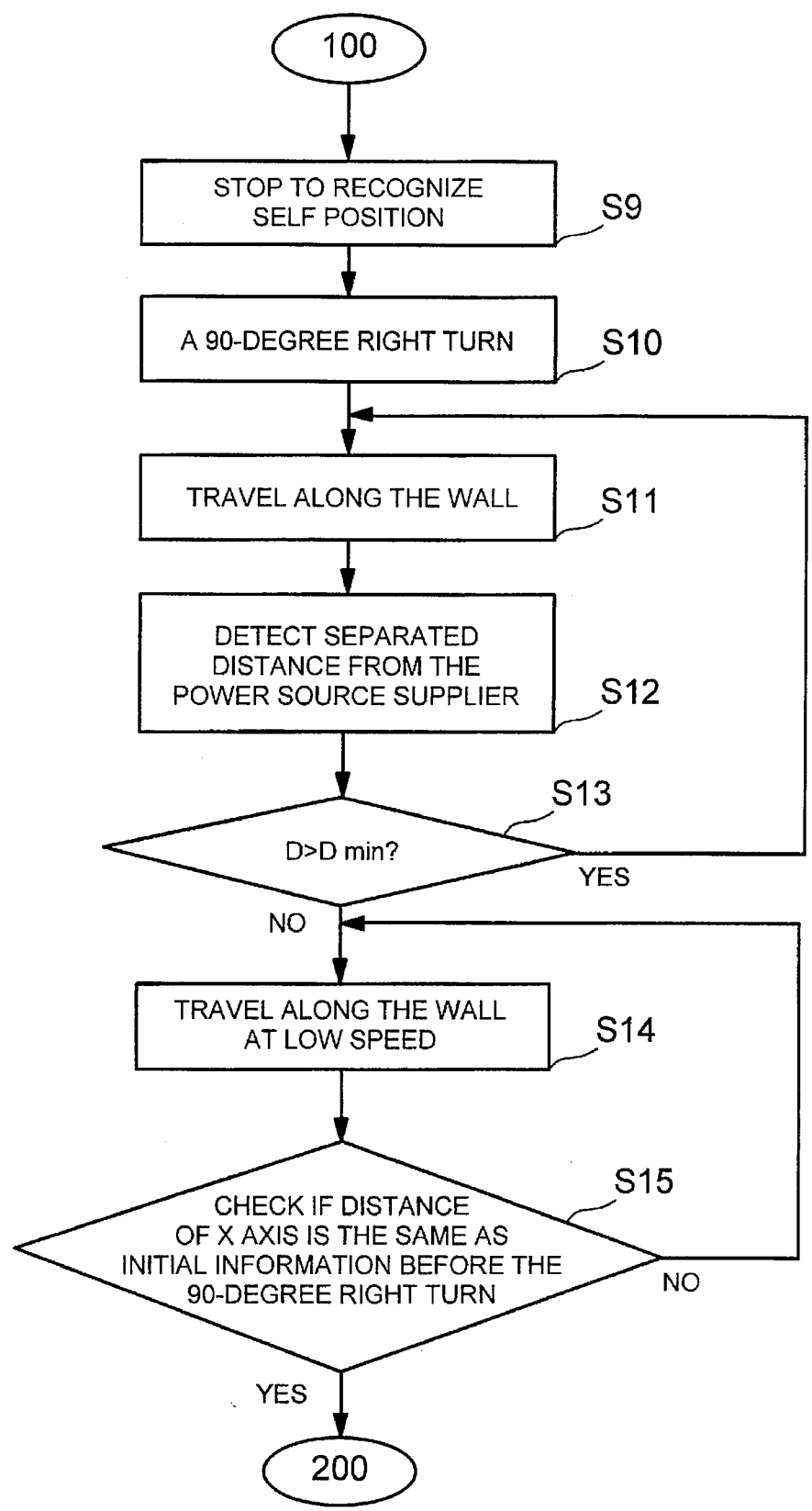
Figure 8C:
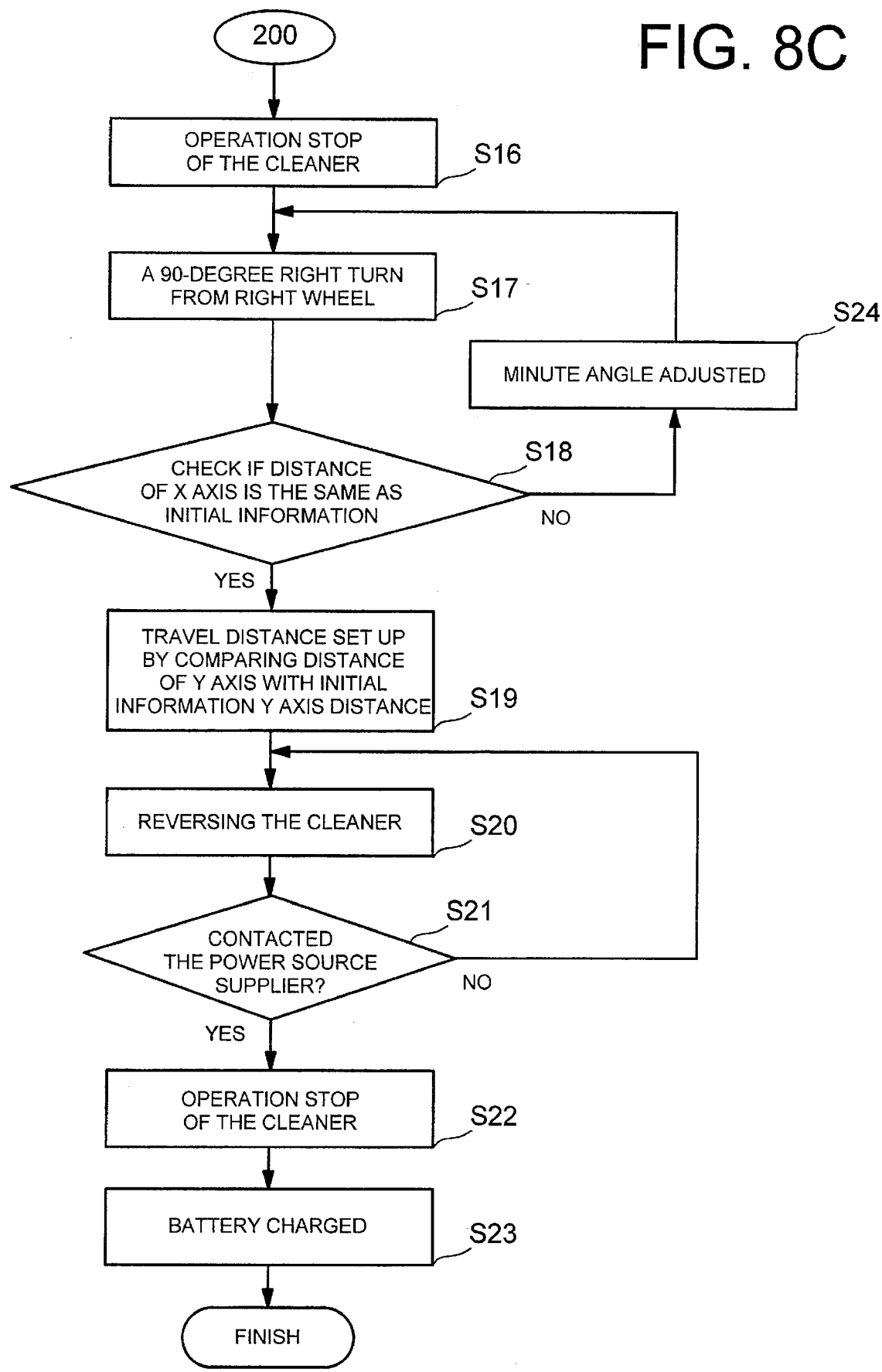

FIGS. 8A, 8B and 8C are flow charts for illustrating operational procedures of charge induction control in the robot cleaner according to the present invention, where reference numeral S denotes step.

First of all, when an operation switch (not shown) is turned on, the control means 20 receives a DC voltage supplied from the battery thereby to initialize the robot cleaner 1.

Figure 9:
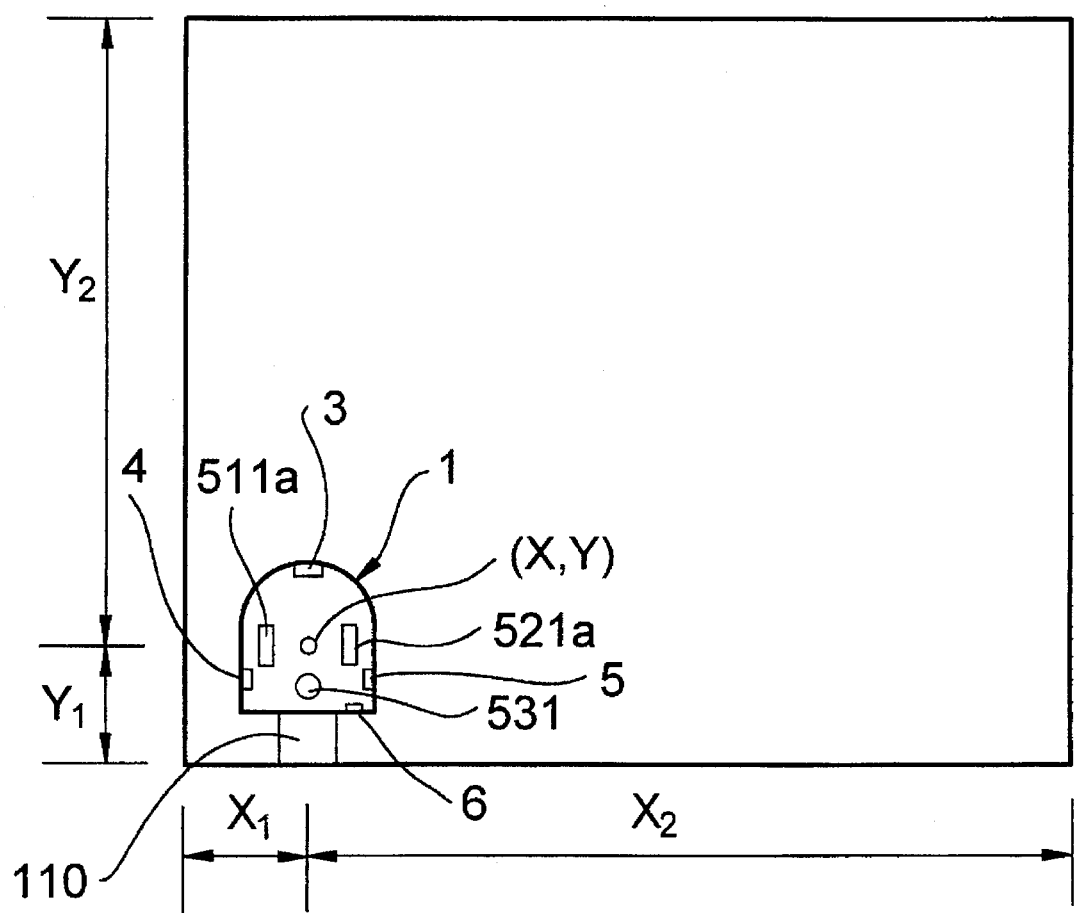
FIG. 9 is a schematic diagram illustrating a connected state between the robot cleaner and the power source supplier according to the present invention.

At this time, the navigation sensor 3 and the ultrasonic sensor 6 arranged at front and rear surfaces of the robot cleaner 1 emit ultrasonic wave in a state where the robot cleaner 1 is connected to the power source supplier 110, and receive an echo signal, in other words, a signal generated by reflection of the ultrasonic wave hitting the wall surface, thereby detecting a position information along the Y axis about the robot cleaner 1, as illustrated in FIG. 9.

The ultrasonic sensors 4 and 5 provided at left and right sides of the robot cleaner i emit ultrasonic wave in a state where the robot cleaner is connected to the power source supplier 110 and receive the echo signal, in other words, the signal generated by the ultrasonic wave being reflected from the wall surface, thereby detecting a position information along the X axis about the robot cleaner 1, as illustrated in FIG. 9.

Accordingly, at step S1, the position information of (X1, Y1) or (X2, Y2) or the like on the X and Y axes detected by the ultrasonic sensors 4, 5 and 6 and the navigation sensor 3 is received by the control means 2, thereby causing the initial position information (X, Y) in a state where the robot cleaner 1 is connected to the power source supplier 110 to be stored.

Later on, at step S2, the navigation sensor 3 and ultrasonic sensors 4, 5 and 6 detect structures and sizes of the rooms, without performing the cleaning operation, in order to store therein information on the structures of the rooms where the cleaning operation is to be performed, and output data detected therefrom to the control means 20.

In other words, by way of the navigation sensor, ultrasonic sensors and the driving means 50, the information on the structures and sizes of the rooms are determined by the control means 20, and the data (information) determined by the control means about the structure and the sizes of rooms is compared with various cleaning programs pre-stored in the memory means 100.

At step S3, according to the structures of the rooms memorized in the initial circulative operation taken at step S2, the most effective and similar cleaning program is selected out of various programs pre-stored in the memory means 100.

Figure 10:
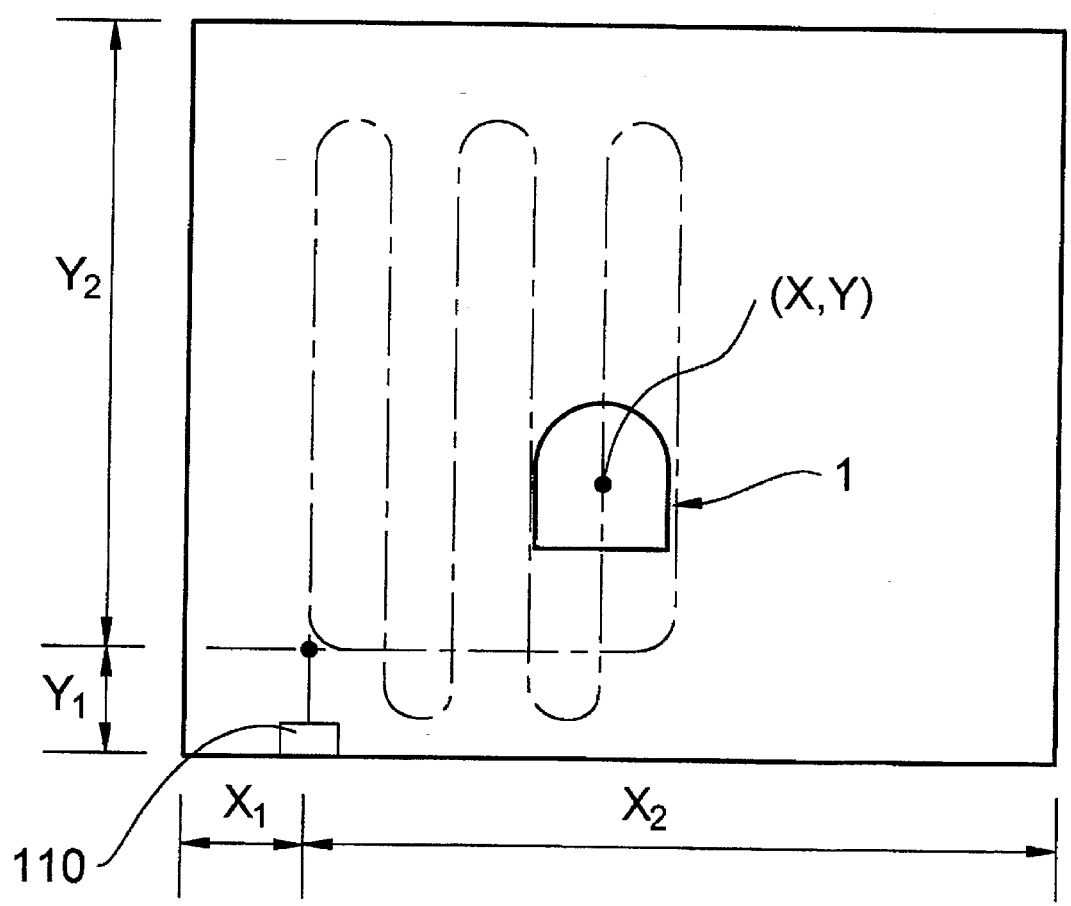
FIG. 10 is a schematic diagram illustrating movement of the robot cleaner according to the present invention.
Figure 11:
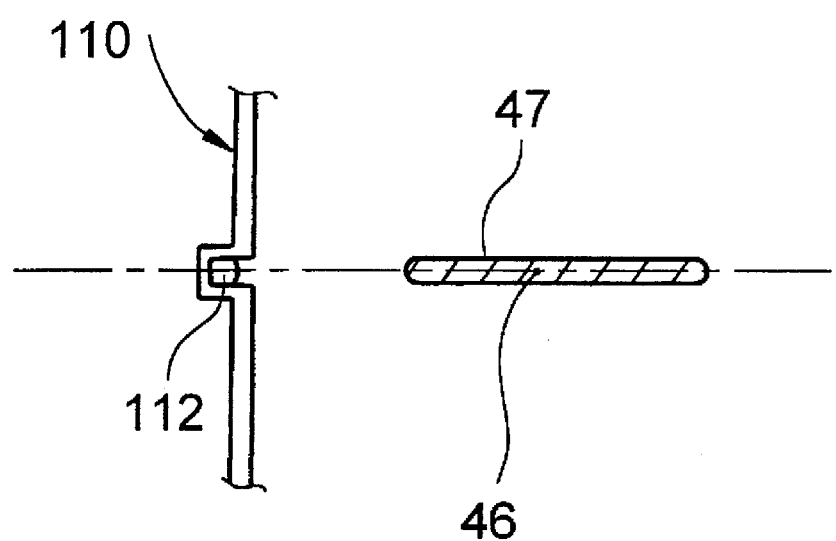
FIG. 11 is a schematic diagram illustrating the error area according to the induction method of the robot cleaner according to the embodiment of the present invention.

Accordingly, at step S4, the control means 20 outputs the control signal to the driving means 50 and the suction motor driving means 90, so that the robot cleaner 1 can travel along a travel track illustrated in FIG. 10 according to the program selected at step S3.

The left motor driving unit 51 and the right motor driving unit 52 of the driving means 50 receive the control signal output from the control means 50, thereby driving a left steering motor 511 and a right steering motor 521 for the robot cleaner 1 to start performing the cleaning operation.

As this time, a left encoder 61 generates a pulse signal according to revolution of a left motor wheel 511a driven by the left steering motor 511, and transmits the same to the control means 20, and a right encoder 62 generates a pulse signal according to revolution of the right motor wheel 521a driven by the right steering motor 521, transmits the same to the control means 20.

Accordingly, the control means 20 receives the pulse signals output from the left and right encoders 51 and 52 to calculate a travel distance covered by the robot cleaner 1.

Meanwhile, the travel direction detecting means 70 detects rotary angular velocities of the left and right motor wheels 511a and 521a rotating by receiving a driving power from the left and right steering motors 511 and 521, thereby outputting rotary angular data detected therfrom to the control means 20.

Accordingly, at the control means 20, the rotary angular data detected by the travel direction detecting means 70 is integrated against time, thereby detecting a travel direction change of the robot cleaner 1, so that the robot cleaner 1 cannot be deviated from a normal track, as illustrated in FIG. 10, in other words, the control means 20 controls the left and right steering motors 511 and 521 so that the robot cleaner 1 can always travel in a predetermined direction, which is the dotted line direction (—).

The navigation sensor 3 provided at a front surface of the robot cleaner 1 emits ultrasonic waves forward as the robot cleaner 1 moves along while performing reciprocating rotation 180 degrees to the left and right, with a forward direction as a base.

The sensor 3 now receives a signal generated by the emitted ultrasonic waves which have been reflected from an obstacle and outputs the same to the control means 20.

The control means 20 receives the signal detected by the navigation sensor 3, thereby calculating a distance to an obstacle and whether or not there is an obstacle ahead of the robot cleaner 1.

The control means 20 discriminates which side, in other words, left or right when viewed by the robot cleaner 1 toward the front, is more distanced from the obstacle on the part of the robot cleaner 1, and controls a pulse width of the left and right steering motors 511 and 521, thereby driving either the left motor wheel 511a or the right motor wheel 521a. The robot cleaner 1 now rotatably moves lest it should come into contact with the obstacle.

Meanwhile, the moment the robot cleaner 1 is driven, the suction motor driving means 90 receives the control signal generated at the control means 20, thereby to drive a suction motor 91.

When the suction motor 91 is rendered operative, such foreign objects as dust and the like on a floor surface to be cleaned are collected by suction force of a brush 9 provided at a bottom surface of the robot cleaner 1. The dust in the room or other foreign objects are now absorbed through a suction hole 2 and at the same time, the absorbed dust and the like are collected in a dust collecting pocket 7 formed in a dust collecting chamber 8, so that the cleaning operation can be carried out.

The charged voltage of the battery 10 gradually drops below a predetermined level as a predetermined time of duration elapses while the robot cleaner 1 performs the cleaning operations, repeating the above procedures.

At step S5, the charge voltage of the battery 10 is detected by a charged level detecting means 30 while the robot cleaner 1 performs the cleaning operation, and the charged voltage level detected therefrom is output to the control means 20.

Meanwhile, the light emitting unit 112 of the power source supplier 110 keeps emitting the optical signal while the robot cleaner 1 performs the cleaning operation.

At this time, at step S6, the charged voltage level of the battery 10 detected by the charged level detecting means 30 is received by the control means 20 and a discrimination is made as to whether the same is below the pre-established certain level.

As a result of the discrimination at step S6, if the charged voltage level of the battery 10 is not below the predetermined level (in case of no), which represents that the battery 10 needs no charging, flow returns to the step S4, thereby continuing to perform the cleaning operation according to the control of the control means 20, and detecting the charged level of the battery 10 by way of the charged level detecting means 30.

Meanwhile, as a result of the discrimination at step S6, if the charged level of the battery 10 is below the predetermined level (in case of yes), which implies that the charged voltage of the battery 10 is in such a consumed state as to entail difficulty in operation of the robot cleaner 1, the control means 20 memorizes position data of a point where the cleaning operation is performed in an intrinsic memory.

At step S7, the control means 20 outputs a control signal to the driving means 50 so that the robot cleaner 1 can be rotated to the right.

The robot cleaner 1 moves to the wall surface W near the power source supplier 110 while performing the cleaning operation in order to approach the power source supplier 110 for supplying the power necessary for charging the battery 10.

Likewise, at step S8, a discrimination is made as to whether the robot cleaner 1 has reached the wall surface near the power source supplier 110, and if the robot cleaner 1 has not reached the wall surface W close to the power source supplier 110 (in case of no), flow returns to the step S7, thereby causing the robot cleaner 1 to keep travelling and performing the cleaning operation until the robot cleaner 1 is close to the wall surface W.

Meanwhile, as a result of the discrimination at step S8, if it is determined that the robot cleaner 1 has reached the wall surface W near the power source supplier 110 (in case of yes), flow proceeds to step S9, thereby causing the driving means 50 to stop operation of the robot cleaner 1 according to the control of the control means 20, which in turn detects information of a present position thereby to recognize a present position of the robot cleaner 1.

At step S10, if the robot cleaner 1 approaches the wall surface W near the power source 110 according to the control of the control means 20, the driving means 50 receives the control signal output from the control means 20 in order that the robot cleaner 1 can switch direction 90 degrees toward a side where there is no wall surface W, and causes the robot cleaner 1 to rotate at a right angle to the right.

Accordingly, at step S11, the robot cleaner 1 keeps moving along the wall surface W at a right angle (90 degrees) to the right, and at step S12, the navigation sensor 3 attached at the front surface of the robot cleaner 1 emits the ultrasonic wave to the front thereof in the direction in which the robot cleaner 1 moves, and receives a signal generated by the ultrasonic wave emitted therefrom and reflected thereafter from the power source supplier 110, thereby detecting a distance at which the robot cleaner 1 is separated from the power source supplier 110 and causes separated distance data D obtained therefrom to be output to the control means 20.

Accordingly, at step S13, it is determined whether the separated distance D detected by the navigation sensor 3 is larger than a minimum distance data (Dmin; in this case, approximately 40 cm) pre-established at the control means 20, and if the separated distance D is larger than the minimum distance data Dmin (in case of yes), flow returns back to step S11, thereby causing the robot cleaner 1 to keep travelling along the wall surface W and to repeatedly perform operations subsequent to step S11.

Meanwhile, as a result of the determination at step S13, if it is determined that the separated distance D is not larger than the minimum distance data Dmin (in case of no), which represents that the robot cleaner 1 has neared the power source supplier 110, travel speeds of the left and right steering motors 511 and 521 are reduced by the driving means 50 according to the control of the control means, step S14, thereby moving the robot cleaner 1 at a reduced low speed.

The control means 20 collects accurate and minute position information the X and Y axes during the robot cleaner's low speed travel by way of the driving means 50, and stores the information therein.

At step S15, it is determined whether a distance on the X axis collected during the robot cleaner's low speed movement at step S14 is the same as the initial information before the 90-degree right turn switch at step S10, and if the position information of X axis is not the same as the initial information (in case of no), the flow returns back to the step S14, thereby causing the robot cleaner 1 to keep travelling at a low speed along the wall surface W until the distance of X axis collected during its low speed movement becomes the same as the initial information before the 90-degree right turn switch at step S10.

Meanwhile, as a result of the determination at the step S15, if the distance on the X axis is the same as the initial information (in case of yes), the flow advances to step S16, and stops the robot cleaner 1 at a distance along the X axis which is the same as the initial information when the robot cleaner 1 turns 90 degrees to the right.

At step S17 the driving means 50 receives the control signal output from the control means 20 in order to check once again the position information of the robot cleaner 1 against the X axis, thereby rotating 90 degees to the right side the robot cleaner 1 around the right motor wheel 512a.

At step S18, it is determined whether the distance on the X axis rotated at a right angle to the right at step S17 is the same as the initial information.

As a result of the determination at step S18, if the distance along the X axis is not the same as the initial information (in case of no), the flow proceeds to step S24 to adjust a minute angular error, and if the distance along the X axis is the same as the inital information (in case of yes), the flow advances to step S19. The navigation sensor 3 and the ultrasonic sensor 6 arranged at the front surface and a rear side of the robot cleaner 1 emit the ultrasonic waves, and receive an echo signal generated by the ultrasonic waves emitted therefrom and reflected thereafter from the wall surface, thereby detect information of the present position against the Y axis.

At this time, the control means 20 compares the information on the present position with the information on the initial position, thereafter establishing a distance the robot cleaner 1 is to move along.

The control means 20 now controls in such a way that the robot cleaner 1 can give a wide berth to the wall surface thereby to keep the robot cleaner 1 from hitting the power source supplier 110.

Subsequently, at step S20, the robot cleaner 1 is moved backward to the power source supplier 110 according to the travel distances established at step S19, and at step S21. A contact sensor 43 detects whether the robot cleaner 1 has touched the power source supplier 110 when the robot cleaner 1 is moved backward at step S20 and outputs a detection signal generated therefrom to the control means 20.

Accordingly, the control means 20 determines whether the robot cleaner 1 has touched the power source supplier 110.

As a result of determination at step S21, if the robot cleaner 1 has not contacted the power source supplier 110 (in case of no), flow returns back to step S20, thereby moving the robot cleaner 1 backward until it is determination that the robot cleaner 1 has touched the power source supplier 110.

Meanwhile, as a result of the determination at step S21, if the robot cleaner 1 has touched the power source supplier 110 (in case of yes), the flow advances to step S22, thereby to stop operation of the robot cleaner 1 according to the control of the control means 20 and to cause the robot cleaner 1 to touch the power source supplier 110.

Now, a further description is given about the process as to how the robot cleaner 1 touches the power source supplier 110. First of all, when a bumper member 42 provided at a power source receiving means 40 hits a right side surface of a vertical side at the power source supplier 110, the contact sensor 43 disposed within the bumper member 42 detects the fact thereof and outputs the same to the control means 20.

Accordingly, a light receiving unit 41 of the power source receiving means 40 receives an optical signal emitted from a light emitting unit 111 of the power source supplier 110 in accordance with the contact between the robot cleaner 1 and the power source supplier 110, and the control means 20 so controls that the robot cleaner 110 can touch the power source supplier 110 according to the optical signal received therefrom.

In other words, as illustrated in FIG. 6, when a pinion member 116 is rotated counterclockwise by driving of a motor (not shown) at the power source supplier 110, a cover member 115 in an engagement with gear teeth of the pinion member 116 is slid in the left direction at an inner side surface of an upper horizontal portion in the body 111.

At the same time, a link member 117 is rotated around a central axis of a third protruder 113e, thereby moving a second protruder 113d to the left side within a second slide hole 113f to draw the link member 117 upwards.

At this time, a first protruder 113b formed at the connecting terminal 113 moves to the left side within a first slide hole 113c while the connecting terminal 113 is moved upwards within a guide groove 114a of a guide member 114.

Accordingly, the connecting terminal 113 passes through a through hole 113a in the body 111 thereby to contact a contact surface 441 of the contact terminal 44 in the power source receiving means 40.

At step S23, the power source supplied from a main power source terminal is applied to a power line 119, guide member 114, connecting terminal 113, contact terminal 44, wiring 44 and the battery 10, thereby starting to charge the battery 10.

As seen from the foregoing, the robot cleaner i reaches the power source supplier accurately without any deviation, thereby making a small error area 47 because any error to the left and right sides becomes nil around an imaginary error center 46. Accordingly, the light receiving unit 41 of the power source receiving means 40 can easily receive the optical signal of the light emitting unit 112 in the power source supplier 110 thereby to shorten an induction time.

When the charging of the battery 10 is completed after lapse of a predetermined period of time, the power source supplier 110 is operated in a reverse way to disconnect the contact with the power source receiving means 40, according to the control of the control means 20, and as illustrated in FIG. 5. The robot cleaner 1 is then separated from the power source supplier 110, thereby to return to a cleaning position stored in the memory of the control means 20 and to restart the cleaning operation from the position thereof.

As described above, according to the charge induction apparatus of the robot cleaner and the method thereof, the robot cleaner is accurately induced to the power source supplier according to the initially-input position information of the power source supplier when the battery power source drops below a predetermined level in the midst of the cleaning operation or after completion of the cleaning operation, thereby making it possible for the robot cleaner to be charged and to be manufactured with a simple construction and to reduce the manufacting cost.

Having described specific preferred embodiments of the invention with reference to the accompanying drawings, it is to be understood that the invention is not limited to those precise embodiments and that various changes and modifications may be effected therein by one skilled in the art without departing from the scope or spirit of the invention as defined in the appended claims.

What is claimed is:

1. A charging apparatus for a robot cleaner which travels along a studied route for carrying out a cleaning operation, the apparatus comprising:

control means for controlling an overall operation of the robot cleaner;

a memory for storing a plurality of driving programs representing structures of various rooms for which cleaning operations will be performed;

driving means for moving the robot cleaner in forward and reverse directions and in left and right directions according to control signals from the control means;

travel distance detecting means for detecting a distance traveled by the driving means;

travel direction detecting means for detecting a travel direction varied by the driving means;

obstacle detecting means for detecting whether or not there is an obstacle within a cleaning area and for detecting a distance to the obstacle from the cleaner;

charge level detecting means for detecting a charge voltage level of a battery changing according to the travel of the cleaner;

an electric power source supplier for charging the battery to above a predetermined level when the charge voltage level of the battery detected by the charge level detecting means drops below the predetermined level; and an electric power source receiving means for electrically connecting the electric power source supplier to the battery so that the power source supplied from the electric power source supplier can be applied to the battery;

said memory including a first storage area for storing initial information representative of said electric power source supplier, and a second storage area for storing current information representative of a current position of said robot cleaner, said control means controlling movement of said robot cleaner towards said electric power source provider based upon said initial information, said current information, and said charge voltage level detected by said charge level detecting means.

2. A charging apparatus for a robot cleaner as defined in claim 1, wherein the electric power source supplier comprises:

a body;

a light emitting unit disposed at an external upper side of a vertical portion on the body so that an optical signal can be generated to induce the robot cleaner;

a connecting terminal movably mounted within an inner area of the body so that the battery can be electrically connected to a contact surface of the electric power source receiving means of the robot cleaner being induced by the optical signal emitted from the light emitting unit; and a guide member for being formed within the body with a guide groove in order to guide the connecting terminal.

3. The charging apparatus for a robot cleaner as defined in claim 2, wherein the electric power source supplier further comprises:

a cover member slidably mounted inside of a horizontal portion of the body so that the connecting terminal which is operationally connected to the guide groove of the guide member can be covered in order not to be seen from outside of the body;

a rotatable pinion member for being rotated to slide the cover member; and a link member for connecting the pinion member, cover member and connecting terminal together so that the connecting terminal can be moved up and down by rotation of the pinion member.

4. A charging apparatus for a robot cleaner as defined in claim 1, wherein the electric power source receiving means comprises:

a light receiving unit for receiving an optical signal generated from a light emitting unit of the electric power source supplier;

a bumper member attached under the light receiving unit in order to cushion a shock of the electric power source receiving means when the robot cleaner hits a side surface of a vertical portion at the electric power source supplier;

a contact sensor disposed within the bumper member to detect a condition where the electric power receiving means has contacted the electric power source supplier; and a contact terminal formed at a lower surface of the robot cleaner so that a connecting terminal of the electric power source supplier can contact the battery via a wiring.

5. A method for charging a robot cleaner which is internally stored with information on a current position thereof, an area to be cleaned and a position of an electric power source supplier, the method comprising the step of:

storing initial position information of the cleaner against X and Y axes in a control means during an initial contact between the cleaner and the electric power source supplier before beginning a cleaning operation;

moving the cleaner in a cleaning operation;

detecting a charge on a battery power source for supplying a driving energy to the cleaner in order to determine to what degree the battery power source has been consumed during movement of the cleaner in the cleaning operation; and moving the robot cleaner to the electric power source supplier according to the internally stored information on a current position and the initial position information stored in the initial position information storage step in order to charge the battery power source when the charge on the battery power source detected by the detecting step is below a predetermined level set by a control means.

6. A method for charging a robot cleaner as defined in claim 5, wherein the initial position information storage step is performed by detecting the initial position information of the robot cleaner against X and Y axes in the cleaning area by way of an ultrasonic sensor.

7. A method for charging a robot cleaner as defined in claim 5, wherein the moving step for moving the robot cleaner to the electric power source supplier includes rotating the robot cleaner to the right so that the robot cleaner travels to a wall surface near the electric power source supplier, determining the position of the robotic cleaner, rotating the robot cleaner 90 degrees to the right to allow the robot cleaner to travel along a wall surface to a position separated from the electric power source supplier by a predetermined distance, moving the robot cleaner into position at a low speed, and moving the robot cleaner backward to connect the robot cleaner to the electric power source supplier.

* * * * *